(12) United States Patent
Jin et al.

(10) Patent No.: US 10,755,139 B2
(45) Date of Patent: Aug. 25, 2020

(54) RANDOM SAMPLE CONSENSUS FOR GROUPS OF DATA

(71) Applicant: Adobe Inc., San Jose, CA (US)

(72) Inventors: Hailin Jin, San Jose, CA (US); Kai Ni, Atlanta, GA (US)

(73) Assignee: Adobe Inc., San Jose, CA (US)

( * ) Notice: Subject to any disclaimer, the term of this patent is extended or adjusted under 35 U.S.C. 154(b) by 453 days.

(21) Appl. No.: 15/494,106

(22) Filed: Apr. 21, 2017

(65) Prior Publication Data

US 2017/0228613 A1 Aug. 10, 2017

Related U.S. Application Data (63) Continuation of application No. 12/323,210, filed on Nov. 25, 2008, now abandoned.

(60) Provisional application No. 61/089,375, filed on Aug. 15, 2008.

(51) Int. Cl.
| | | |
|---|---|---|
| G06F 17/10 | (2006.01) | |
| G06K 9/62 | (2006.01) | |
| G06K 9/00 | (2006.01) | |
| G06K 9/46 | (2006.01) | |

(52) U.S. Cl.
CPC ........ *G06K 9/6211* (2013.01); *G06K 9/00208* (2013.01); *G06K 9/4604* (2013.01); *G06K 9/4652* (2013.01); *G06K 9/627* (2013.01)

(58) Field of Classification Search
CPC ........... G06F 17/5004; G06K 9/00208; G06K 9/6211; G06K 9/00214; G06K 9/4604; G06K 9/4652; G06K 9/627

USPC .......................................................... 703/2
See application file for complete search history.

(56) References Cited

U.S. PATENT DOCUMENTS

| | | | | |
|---|---|---|---|---|
| 5,602,944 | A * | 2/1997 | Yokoyama | G02B 7/34 356/390 |
| 5,668,374 | A | 9/1997 | DiFoggio et al. | |
| 7,728,833 | B2 | 6/2010 | Verma et al. | |
| 8,345,986 | B2 * | 1/2013 | Nakagomi | G06K 9/46 345/426 |
| 8,345,988 | B2 * | 1/2013 | Shan | G06K 9/00201 382/218 |
| 2005/0216237 | A1 * | 9/2005 | Adachi | G06T 17/00 703/1 |
| 2008/0238919 | A1 | 10/2008 | Pack | |
| 2009/0208053 | A1 | 8/2009 | Kent | |

(Continued)

OTHER PUBLICATIONS

Vural et al. (Outlier removal for Sparse 3D reconstruction from video). (Year: 2008).*

(Continued)

*Primary Examiner* — Andre Pierre Louis
(74) *Attorney, Agent, or Firm* — SBMC (57) ABSTRACT

In one embodiment, a computer accessible storage medium stores a plurality of instructions which, when executed: group a set of reconstructed three dimensional (3D) points derived from image data into a plurality of groups based on one or more attributes of the 3D points; select one or more groups from the plurality of groups; and sample data from the selected groups, wherein the sampled data is input to a consensus estimator to generate a model that describes a 3D model of a scene captured by the image data. Other embodiments may bias sampling into a consensus estimator for any data set, based on relative quality of the data set.

20 Claims, 4 Drawing Sheets

(56) References Cited

U.S. PATENT DOCUMENTS

| | | |
|---|---|---|
| 2009/0252377 A1 | 10/2009 | Akita et al. |
| 2010/0134225 A1 | 6/2010 | Saint-Pierre et al. |
| 2013/0124147 A1 | 5/2013 | Jin |

OTHER PUBLICATIONS

Chum etal. (Matching with PROSAC—Progressive Sample Consensus, (7 pages)). (Year: 2005).*
"Advisory Action", U.S. Appl. No. 12/323,210, dated Jul. 25, 2012, 2 pages.
"Examiner's Answer to Appeal Brief", U.S. Appl. No. 12/323,210, dated Mar. 3, 2016, 6 pages.
"Final Office Action", U.S. Appl. No. 12/323,210, dated Mar. 15, 2013, 8 pages.
"Final Office Action", U.S. Appl. No. 12/323,210, dated Apr. 10, 2015, 11 pages.
"Final Office Action", U.S. Appl. No. 12/323,210, dated Dec. 31, 2013, 11 pages.
"Final Office Action", U.S. Appl. No. 12/323,210, dated Apr. 5, 2012, 8 pages.
"Non-Final Office Action", U.S. Appl. No. 12/323,210, dated Jul. 8, 2013, 10 pages.
"Non-Final Office Action", U.S. Appl. No. 12/323,210, dated Jul. 21, 2014, 11 pages.
"Non-Final Office Action", U.S. Appl. No. 12/323,210, dated Oct. 4, 2011, 7 pages.
"Non-Final Office Action", U.S. Appl. No. 12/323,210, dated Aug. 13, 2012, 8 pages.
"PTAB Decision", U.S. Appl. No. 12/323,210, dated Feb. 21, 2017, 9 pages.
Capel,"An Effective Bail-Out Test for RANSAC Consensus Scoring", British Machine Vision Conference (BMVC, 2005, 10 pages.
Chum,"Locally Optimized RANSAC", Annual Symposium German Association Pattern Recognition, 2003, 8 pages.
Chum,"Matching with PROSAC—Progressive Sample Consensus", IEEE Conference on Computer Vision and Pattern Recognition (CVPR), 2005, 7 pages.
Chum,"Optimal Randomized RANSAC", IEEE Transactions on Pattern Analysis and Machine Intelligence, vol. 30, No. 8, Aug. 2008, 11 pages.
Chum,"Randomized RANSAC with Td,d Test", BMVC 2002, 2004, pp. 448-457.
Comaniciu,"Mean Shift: A Robust Approach Toward Feature Space Analysis", IEEE Transactions on Pattern Analysis and Machine Intelligence, vol. 24, No. 5, May 2002, pp. 603-619.
Fischler,"Random sample consensus: a paradigm for model fitting with applications to image analysis and automated cartography", Communications of the ACM, 24(6):381395, Jun. 1981, pp. 381-395.
Frahm,"RANSAC for (Quasi-)Degenerate Data (QDEGSAC)", IEEE Conference on Computer Vision and Pattern Recognition (CVPR), 2006, 8 pages.
Lowe,"Distinctive Image Features from Scale-Invariant Keypoints", International Journal of Computer Vision, Available at <http://www.cs.ubc.ca/~lowe/papers/ijc04.pdf>, Jan. 5, 2004, pp. 1-28.
Martin,"Learning to Detect Natural Image Boundaries Using Local Brightness, Color, and Texture Cues", IEEE Transactions on Pattern Analysis and Machine Intelligence, vol. 26, No. 5, May 2004, pp. 530-549.
Matas,"Randomized RANSAC with Sequential Probability Ratio Text", Proceedings of the 10th IEEE International Conference on Computer Vision (ICCV), 2005, 6 pages.
Myatt,"NAPSAC: High Noise, High Dimensional Robust Estimation—It's in the Bag", BMVC 2002, 2002, pp. 458-467.
Nister,"Preemptive RANSAC for Live Structure and Motion Estimation", International Conference on Computer Vision 2003, 2003, 8 pages.
Raguram,"A Comparative Analysis of RANSAC Techniques Leading to Adaptive Real-Time Random Sample Consensus", European Conference on Computer Vision (ECCV), 2008, 14 pages.
Rodenhorst,"Genetic Algorithm Sample Consensus (GASAC)—A Parallel Strategy for Robust Parameter Estimation", Proceedings of Conference on Computer Vision and Pattern Recognition Workshop, 2006, 8 pages.
Snavely,"Modeling the World from Internet Photo Collections", International Journal of Computer Vision, vol. 80, Issue 2—Available at <http://phototour.cs.washington.edu/ModelingTheWorld_ijcv07.pdf>, Nov. 2008, 22 pages.
Tordoff,"Guided Sampling and Consensus for Motion Estimation", European Conference on Computer Vision (ECCV), 2002, 15 pages.
Torr,"MLESAC: A New Robust Estimator with Application to Estimating Image Geometry", Computer Vision and Image Understanding, 78, 2000, pp. 138-156.
Zach,"What Can Missing Correspondences Tell Us About 3D Structure and Motion?", IEEE Conference on Computer and Pattern Recognition, 2008, 8 pages.

* cited by examiner

RANDOM SAMPLE CONSENSUS FOR GROUPS OF DATA

RELATED APPLICATIONS

This application is a continuation of and claims priority to U.S. patent application Ser. No. 12/323,210 filed Nov. 25, 2008 entitled "Random Sample Consensus for Groups of Data," which claims priority to U.S. Provisional Patent Application Ser. No. 61/089,375 filed Aug. 15, 2008 entitled "Random Sample Consensus for Groups of Data." These disclosures are incorporated by reference herein in their entirety.

BACKGROUND

A common problem encountered when processing data that represents physical phenomena is computing a model of the phenomena from the data points, especially when the data points are corrupted with noise and other inaccuracies. For example, the phenomena can be a three dimensional physical scene that has been captured as one or more images from a camera that is in motion within the three dimensional physical scene. Other examples include any measurements of data from a physical system (e.g. data acquired via one or more sensors in a data acquisition system). One example includes seismic data captured in a system, where the seismic data can be processed to determine geological features underlying the surface.

Various methods for processing the data to compute the model often include statistical analysis of the data using a consensus estimator. The consensus estimator samples a minimal number of points from the data and attempts to compute a model that fits the sampled data. For example, a line model can be constructed from a sample of two or more points, and a plane model can be constructed from a sample of three or more points. The constructed model is then verified over all the data. Repeated sampling of the data and computing a best fit model may be performed, and the fit of the models to all of the data may be compared to select a best model out of the constructed models. Examples of such consensus estimators include RANSAC and some of its variants, such as progressive sample consensus (PROSAC), randomized RANSAC, progressive RANSAC, maximum likelihood estimation sample consensus (MLESAC or MAPSAC), N adjacent points random consensus (NAPSAC), importance sampling consensus (IMPSAC), and robust filtering by consensus (KALMANSAC).

The above methods may arrive at a solution given enough computational resources. However, when the inlier ratio is low (that is, the number of outliers is large compared to the number of inliers), the computational cost may be too high and a solution may not be achieved within a desired time frame.

SUMMARY

In one embodiment, a computer accessible storage medium stores a plurality of instructions which, when executed: group a set of reconstructed three dimensional (3D) points derived from image data into a plurality of groups based on one or more attributes of the 3D points; select one or more groups from the plurality of groups; and sample data from the selected groups, wherein the sampled data is input to a consensus estimator to generate a model that describes a 3D model of a scene captured by the image data. Corresponding method and computer system implementations are contemplated.

In an embodiment, a computer accessible storage medium stores a plurality of instructions which, when executed on a computer: group data derived from a physical phenomena into a plurality of groups based on one or more attributes of the data; select one or more groups from the plurality of groups; and sample data from the selected groups, wherein the sampled data is input to a consensus estimator to generate a model that describes the physical phenomena. Corresponding method and computer system implementations are contemplated.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for determining structure from motion are described. For example, the system may receive a set of images captured by a camera. From the images, the system may determine various camera motion parameters and various parameters for a 3D model of the objects in the images. The camera motion parameters may include, for example, camera rotations, focal lengths, 3D orientation, 3D translation (movement in 3D space), etc. The 3D model parameters may include the location, within a 3D space, of the various points from the images. Feature correspondences may be determined by applying feature matching among a set of images. Embodiments may implement a modified form of a consensus estimator in which 3D points reconstructed from the point correspondences are grouped into "natural" groups. The natural groups depend on the underlying data. For example, in computer vision, the set of feature correspondences that are identified between the image of interest and a given different image may be grouped. That is, feature correspondences are grouped based on the other image (not the image of interest) in which the correspondences are found. Other embodiments may implement the modified consensus estimator in other areas of computer vision and/or other different areas, examples of which are described below.

The modified consensus estimator may select one or more groups for each iteration, and then sample points from the selected group or groups. The sampled points may be provided to the core consensus estimator (e.g. RANSAC) to produce a model of the 3D scene captured by the images. Because the points are selected from groups of related points, the likelihood may be higher that the selected points are inliers (and thus that a reasonably accurate model may be produced).

In one embodiment, the modified consensus estimator may score the quality of the data in the groups (e.g. by the number of 3D reconstructed points in the group, the residues calculated from the fundamental matrix determined from a matching pair of images, etc.). The sampling process may be modified so that, initially, the samples are taken from the group or groups with the best quality scores. That is, groups with lower quality scores are not included in the data set from which samples are selected. By using the highest quality data first, the consensus estimator may more rapidly converge on a correct solution (e.g. a reasonably accurate solution) than if sampling across all of the input data is performed, in some embodiments. For example, embodiments in which the input data includes a significant number of outliers (or a low inlier ratio, where the inlier ratio is the ratio of the number of inliers to the total number of input data points) may converge to a solution more rapidly.

In another embodiment, the groups may be arranged into group configurations. Each group configuration comprises a set of one or more groups associated with a set of points. A given group configuration may comprise one group, or two or more groups. In the case of two or more groups, the associated set of points may be a combination of the points from the two or more groups, where each point is represented one time in the combination. Group configurations up to M groups may be formed, where M is the number of points sampled in one iteration of the consensus estimator. Group configurations greater than M groups may not be needed, since M groups is large enough to provide the sample of points within only one point from each group.

The sampling of points may proceed through a set of stages, where the group configurations that are available for sampling in a given stage all include the same number of groups. For example, in the first stage, group configurations having a single group may be available. In the second state, group configurations having two groups may be available, etc. For each iteration, a group may be sampled from the available groups, and points may be sampled from the sampled group. The sampled points are again provided to the core consensus estimator, which may produce a model that may be verified over all the points.

Generally, a consensus estimator may sample the input data (e.g. 3D reconstructed points, in computer vision) and generate a potential mathematical model (e.g. camera motion parameters and 3D models of the objects in the image) to accurately describe the samples. The potential model may then be scored across all of the input data, where the score is an indication of how well the model fits the input data. RANSAC is an exemplary consensus estimator. RANSAC is an abbreviation for "RANdom SAmple Consensus". RANSAC may be used to estimate parameters of a model from a set of observed data which contains outliers (observations which are not actually part of the model). For example, outliers in computer vision may be point correspondences between two images that are not actually related (e.g. the images are actually depicting different real world objects, even though some features appear to be similar according to the feature matching process). Any such estimator may be used, in various embodiments. In some embodiments, by biasing the point sampling in the RANSAC algorithm, a solution may be found where unmodified RANSAC would fail.

Figure 1:
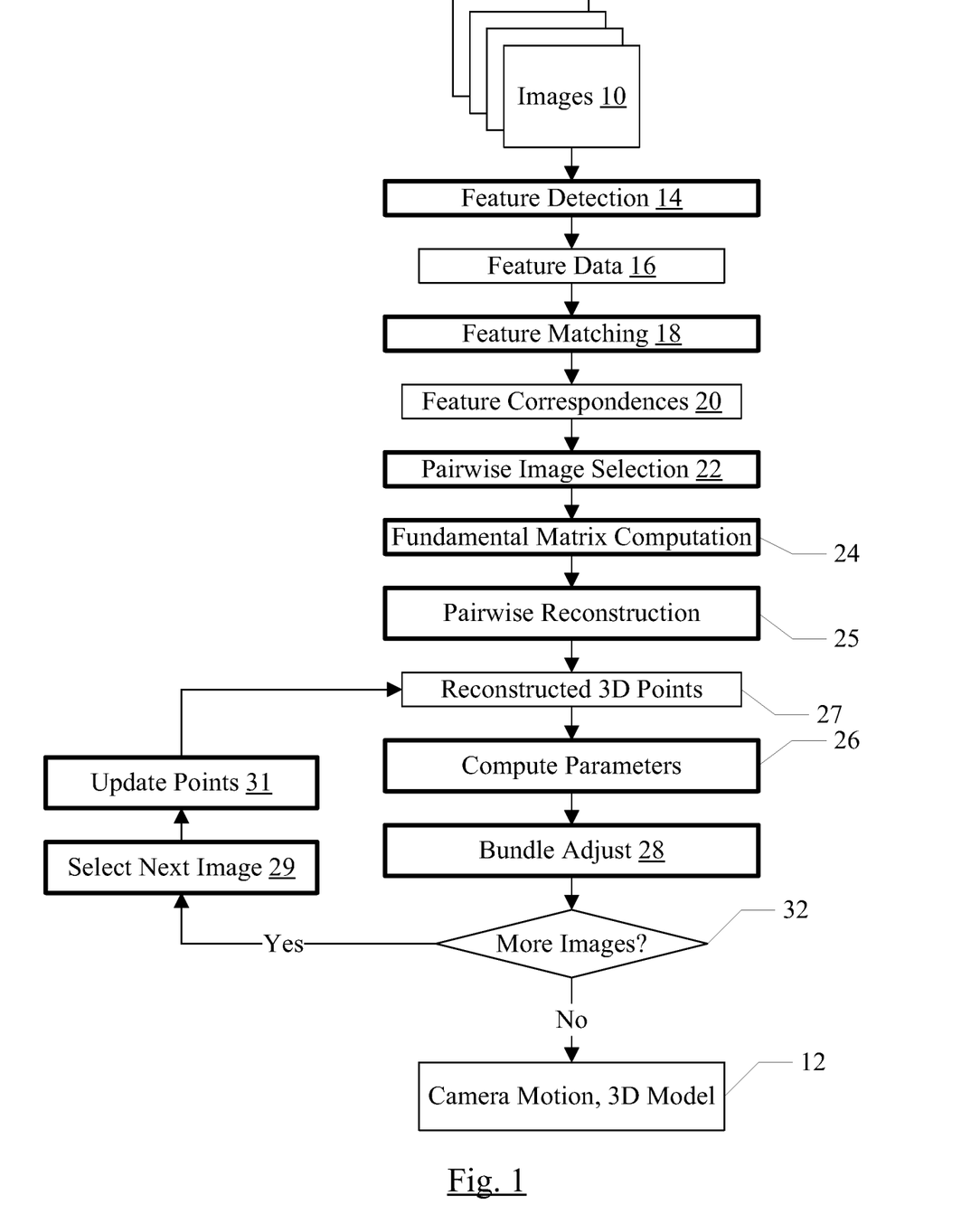
FIG. 1 illustrates an exemplary structure from motion system according to one embodiment.

FIG. 1 illustrates an exemplary structure from motion system that may employ the consensus estimator described herein, in one embodiment. In FIG. 1, heavy line boxes indicate code segments or modules that implement portions of the structure from motion system, in one embodiment. Lighter line boxes illustrate data or data structures. In some embodiments, one or more of the modules and/or the system as a whole may be implemented in hardware and/or a combination of code and hardware. Each code segment or code module comprises a plurality of instructions which, when executed in a computer system or systems, may implement the operation described for the module.

A set of images 10 may be provided to the system, which may produce camera motion parameters, a 3D model of objects in the image, etc. (reference numeral 12). The images may be provided to the feature detection module 14, which may detect various features in the images. The detected features are described for each image in the feature data 16 as shown in FIG. 1. In general, features may comprise any identifiable structures in the image. For example, features may comprise one or more of points, lines, curves, surfaces, etc., in various embodiments. The feature matching module 18 may compare the feature data 16 for various pairs of images, and may generate feature correspondences 20 between the pairs of images. The feature correspondences may identify the images for which the correspondence is detected, as well as the location of the matched feature in each image. The feature correspondences 20 may further include other information regarding the features (e.g. color, data describing the gradient in the image near the features, etc.).

In some embodiments, any known method for feature detection and feature matching may be implemented in the feature detection module 14 and the feature matching module 18. In other embodiments, feature matching between pairs of images may be performed as mentioned above. Additionally, in some embodiments, the input images may be segmented using various image segmentation algorithms. The system may count potential feature correspondences between regions in the two images based on the previously matched feature correspondences. The system may employ Progress Sample Consensus (PROSAC) to recover the projective transformation between the best region pair (e.g. the region pair having the highest number of potential correspondences). The projective transformation recovered using PROSAC may be applied to the other region pairs, and region pairs that are consistent may be removed and the corresponding points may be included with the best region pair. Topological information may be used to match remaining regions. In this manner, additional feature correspondences may be identified that may be missed in standard feature detection/feature matching mechanisms.

Once the feature correspondences have been detected, the system may attempt to identify the camera parameters and corresponding 3D model parameters for the images. In general, the camera parameters and 3D model parameters may be determined by optimizing the parameters together to minimize the reprojection errors of the matched features into the images. In one implementation, the compute parameters module 26 may attempt to find camera parameters and 3D model parameters based on the reconstructed 3D points mentioned above. The result may be optimized to minimize reprojection error in the bundle adjustment module 28.

The pairwise image selection module 22 may select a pair of images to initialize the reconstruction of camera parameters and 3D model parameters. The pair may include an image of interest from the images 10. The image of interest may be identified in any fashion. For example, user input may identify the image of interest. In another example, the image of interest may be automatically selected. The pairwise image selection module 22 may further select an additional image that has feature correspondences with the image of interest and has sufficient parallax with respect to the image of interest. For example, the image having the most feature correspondences with the image of interest may be selected. In yet other embodiments, the pair having the most feature correspondences may be selected, and one of the pair may be arbitrarily identified as the image of interest.

Based on the feature correspondences between the pair of images identified by the pairwise image selection module 22, the fundamental matrix computation module 24 may calculate the fundamental matrix for the image pair. The fundamental matrix may generally be a matrix that describes how corresponding points in one image are related to the points in the other image, although there are uncertainties in the overall relationship since the camera motion parameters are not accurately known. Fundamental matrix calculation module 24 may calculate the fundamental matrix in any known fashion.

The fundamental matrix from the fundamental matrix computation module 24 and the feature correspondences 20 may be provided to the pairwise reconstruction module 25. The pairwise reconstruction module 25 may use this data to estimate the locations of the points from the matched features in 3D space ("reconstructed 3D points"). The estimates may be formed from the relative positions of the matching features within the respective images and the fundamental matrix. The pairwise reconstruction module 25 may initialize the reconstructed 3D points data structure 27 with the reconstructed 3D points from the initial image pair.

Generally, the compute parameters module 26 may attempt to recover the camera parameters corresponding to each additional image and the 3D points that are added by each additional image that is added to the images that have been processed. In the initial iteration, the reconstructed 3D points provided by the pairwise reconstruction module 25 may be used to recover the initial camera parameters and 3D points. Subsequently, the points added from the newly selected image (by the select next image module 29) may be recovered as well as additional camera parameters corresponding to the newly selected image.

The compute parameters module 26 may use the reconstructed 3D points to compute the camera motion parameters and 3D model parameters. Specifically, in one embodiment, the compute parameters module 26 may group the 3D reconstructed points into natural groups. For example, the points corresponding to a given image of interest may be grouped based on which other images the points are detected in. A given point may be detected in more that one other image, and may be included in the groups for each other image in which they are detected. The compute parameters module 26 may optionally score the groups based on the likelihood that the feature correspondences are inliers. The compute parameters module 26 may initially provide points for sampling by a consensus estimator such as RANSAC and/or its variants from the highest scoring group or groups, and may gradually permit sampling of points from lower scoring groups as the estimator iterates. In another embodiment, group configurations may be generated and a group configuration may be selected (from which the points may be selected). The verification of the proposed model generated by an iteration of the consensus estimator may still be performed over the full set of reconstructed 3D points 27 (i.e. including those points that are not in the groups from which sampling is performed).

Upon completion of the compute parameters module 26, the system may perform bundle adjustment on the result to refine the camera parameters and 3D model by minimizing the reprojection error in the bundle adjustment module 28. In some embodiments, any bundle adjustment algorithm may be used. The bundle adjustment algorithm is typically a non-linear algorithm. For example, the Levenberg-Marquardt algorithm may be used in one embodiment, although any algorithm may be used in other embodiments. Generally, non-linear algorithms require computational effort that increases non-linearly with respect to the number of points input to the algorithm. For example, the Levenberg-Marquardt algorithm may scale quadratically with the number of points. It is possible to use all points in some embodiments, and all points may be used in some embodiments. In other embodiments, the bundle adjustment module may attempt to quantify the contribution of each point to each parameter being determined by the system (e.g. camera motion parameters and 3D model parameters). Points with the highest contribution may be selected and the contribution of the remaining points may be updated. Once enough points have been selected to constrain the desired parameters at a given threshold of accuracy, the non-linear algorithm maybe executed over the selected points. Optionally, additional points may be selected to further improve the accuracy of the solution.

The compute parameters module 26 and the bundle adjustment module 28 may thus complete the first iteration of camera motion parameter estimation and 3D model parameter estimation based on the initial image pair. Additional iterations may then be performed based on additional images in the set of images 10. If there are still more images to process (decision block 32, "yes" leg), a select next image module 29 may select another image. For example, the image having the next highest number of feature correspondences with the image of interest (or with another image that has already been processed) may be selected. The update points module 31 may update the reconstructed 3D points with additional points derived from the selected image, and the modules 26 and 28 may be iterated again. Each iteration may further refine the parameter estimates. If there are no more images to process (decision block 32, "no" leg), the structure from motion system may store the camera motion parameters and 3D model parameters (reference numeral 12).

While FIG. 1 illustrates that the bundle adjustment module 28 executes on each iteration (for each image), some embodiments may only execute the bundle adjustment module 28 every "N" iterations of the loop (e.g. after every N new images have been processed). "N" may generally be a positive integer (e.g. 5, 10, etc.).

The modules 22, 24, 26, and 28 may be iterated for other images of interest to determine additional camera motion and 3D model parameters for the result 12. Alternatively, the system may operate in parallel on different images of interest (e.g. on different computer systems in a distributed computing platform). Still further, the system may operate in parallel based on different images of interest, and the results from the parallel operations may be merged at some point. For example, user input may determine when the parallel operations are to be merged, or the system may select the merge point automatically. The merge point may be selected at any time after at least one common image has been processed in the parallel operations, in various embodiments.

Figure 2:
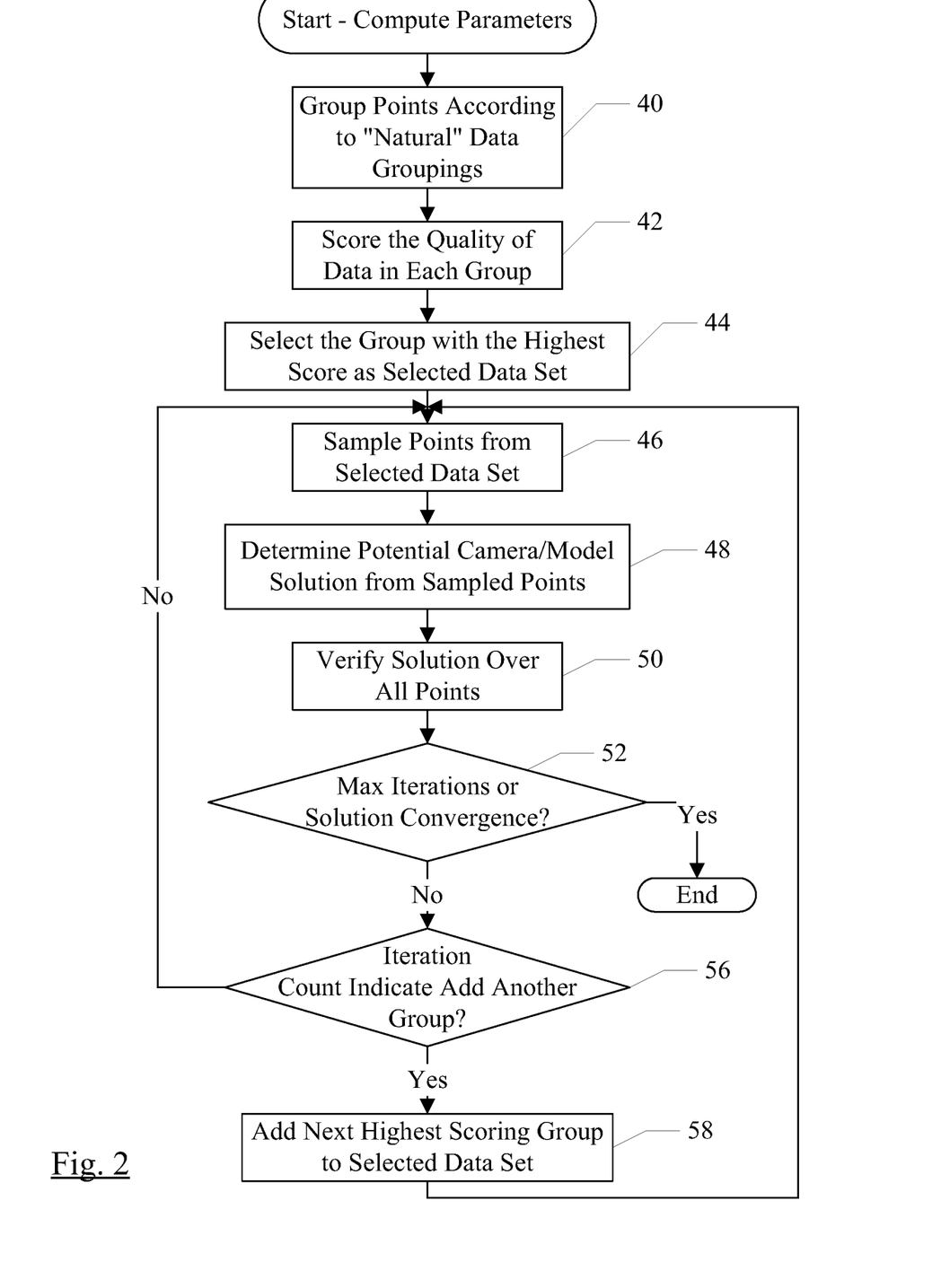
FIG. 2 is a flowchart illustrating a portion of one embodiment of a compute parameters block shown in FIG. 1.

Turning now to FIG. 2, a flowchart is shown illustrating at least a portion of the operation of the compute parameters module 26 for one embodiment. While the blocks are shown in a particular order for ease of understanding, other orders may be used. In one embodiment, the compute parameters module 26 may comprise instructions which, when executed on a computer system or systems, implement the operation of the flowchart shown in FIG. 2.

The module 26 may group the reconstructed 3D points 27 (more briefly, "points" for the remainder of the description of FIG. 2) according to the natural data groupings (block 40). For example, points that exist in a given image may be grouped together. In other embodiments, the points may be grouped according to color segmentation or other image segmentation techniques. Any grouping using knowledge of any attribute or attributes of the underlying data set may be used in various embodiments.

The module 26 may score each group according to a quality measure of the data (block 42). For example, if points are grouped according to images in which they exist, a group having a larger number of points may be viewed as higher quality than a group having fewer points. The score may be the sum of the number of points, for example, in such an embodiment. Other embodiments may calculate the score of a given group from the residue of the fundamental matrix corresponding to the pair of images. In general, the quality score may be an indication of the likelihood that the data contains inlier points rather than outliers introduced via noise or other data corruption. That is, higher quality groups are more likelihood to include good data points and less likelihood to include false data points introduced via data corruption.

The module 26 may select the group having the highest score (or two or more groups having the highest scores) as the selected data set (block 44). The selected data set may be provided as the input to the consensus estimator, which may sample points from the selected data set (block 46). For example, in one embodiment, the consensus estimator may be RANSAC or one of its variants. In such an embodiment, 3 points may be sampled from the selected data set. The consensus estimator may use the sampled points to determine a potential solution to the camera parameters and 3D model (block 48). The consensus estimator may verify the solution over all points (block 50). That is, the verification of the solution may be performed over the points presented to the module 26, not just the points in the selected data set from which sampling is performed. The verification may generally comprise generating a score for the solution, indicating how well the solution fits the points as a whole. Relative scores of solutions may indicate which solution is a better fit.

If the maximum number of iterations of the consensus estimator have been performed, or if the solution has converged to an acceptable accuracy (decision block 52, "yes" leg), the module 26 may be complete. The maximum number of iterations may be user selected or may be a default value, and generally may be provided to cause the consensus estimator to exit if it is not converging to a solution. The solution may be considered to be converged if its score over all the points indicates that the solution is accurate enough to move to the bundle adjustment module 28. The measurement for determining convergence may also be user programmable, may have a default value, etc.

If the maximum number of iterations have not been performed and the solution has not converged (decision block 52, "no" leg), the module 26 may check the iteration count to determine if another group of points is to be added to the selected data set (decision block 56). The determination of which iteration counts cause the addition of groups may be made in many different fashions. For example, the scores of the groups determined as mentioned above with regard to block 42 may be used to determine when additional groups of points are added to the selected data set. In one implementation, the scores may be summed and the ratio of the highest score to the sum may indicate a percentage of the maximum number of iterations for which only the highest scoring group is in the selected data set. After the initial iterations have expired, the points from the second highest scoring group may be added to the selected data set. The ratio of the second highest score to the sum of the scores may indicate a percentage of the maximum number of iterations for which the highest scoring two groups form the selected data set, etc. Effectively, such a scheme weights the points in each group according to the relative quality of each group. Other embodiments may use other schemes based on the score to bias the samples to the groups having the highest quality scores.

If another group of points is to be added to the selected data set (decision block 56, "yes" leg), the module 26 may select the next highest scoring group (that has not yet been selected) and may add the points from the group to the selected data set (block 58). The module 26 may then begin the next iteration by sampling from the updated selected data set (block 46). If another group of points is not to be added (decision block 56, "no" leg), the module 26 may begin the next iteration without modifying the selected data set.

In other embodiments, the scoring of the groups may be used to bias the data set from which points are sampled in other fashions. For example, the points from a given group may be repeated in the data set as multiple instances, where the relative number of instances of each group in the set may be based on the relative scores of the groups. Thus, since the points from the higher scoring groups are included in the sample set more frequently, those points will be more likely to be selected in a given sample.

Figure 4:
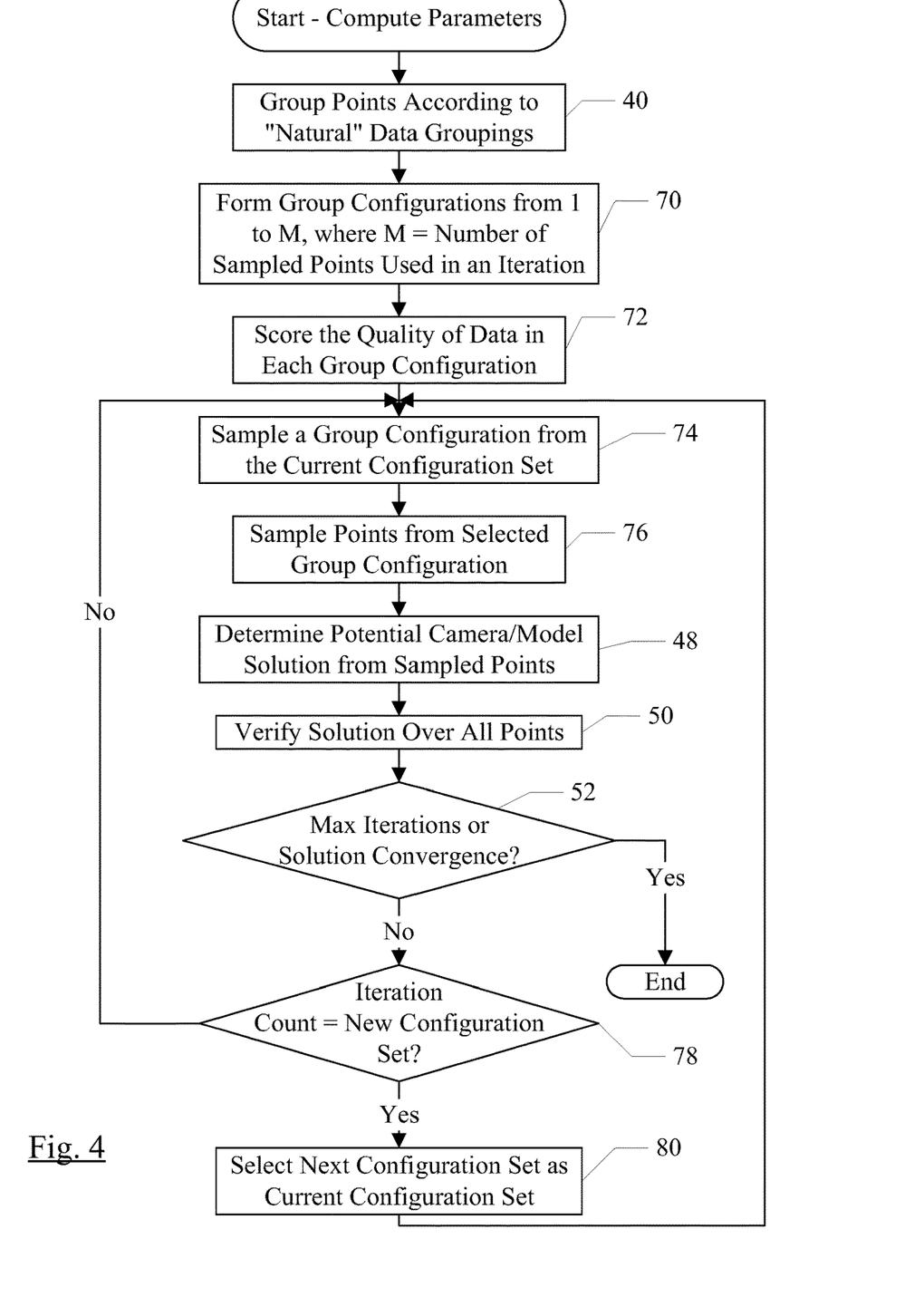
FIG. 4 is a flowchart illustrating a portion of another embodiment of a compute parameters block shown in FIG. 1

Turning now to FIG. 4, a flowchart is shown illustrating at least a portion of the operation of the compute parameters module 26 for another embodiment. While the blocks are shown in a particular order for ease of understanding, other orders may be used. In one embodiment, the compute parameters module 26 may comprise instructions which, when executed on a computer system or systems, implement the operation of the flowchart shown in FIG. 4.

The module 26 may group the reconstructed 3D points 27 (more briefly, "points" for the remainder of the description of FIG. 4) according to the natural data groupings (block 40), similar to the embodiment shown in FIG. 2.

The module 26 may form group configurations among the groups (block 70). Generally, the group configurations may include between 1 and M groups, where M is the number of points that are sampled in one iteration of the consensus estimator. Each possible group configuration may be formed. For example, there may be a group configuration for each group, containing only that group, in the set of group configurations. Similarly, each possible combination of two groups may be included in a group configuration, each possible combination of three groups may be included in a group configuration, etc.

The module 26 may optionally score each group configuration according to a quality measure of the data in the group or groups represented by that group configuration (block 72). For example, a group configuration having a larger number of points may be viewed as higher quality than a group configuration having fewer points, for group configurations containing the same number of groups. The score may be the sum of the number of points, for example, in such an embodiment. In general, the quality score may be an indication of the likelihood that the data contains inlier points rather than outliers introduced via noise or other data corruption. That is, higher quality groups are more likelihood to include good data points and less likelihood to include false data points introduced via data corruption.

The module 26 may sample a group configuration from the current set of configurations (block 74). Generally, the current set of configurations may be the set of group configurations containing a specific number of groups that are being sampled in the current stage of the sampling process. The current configuration set may initially be the set of group configurations containing one group. Once the first stage is complete, the module 26 may start the next stage with a new current configuration set that comprises the set of group configurations containing two groups, etc. In some embodiments, the sampling of group configurations may be biased toward the group configurations having the highest score as compared to other group configurations in the current configuration set. The module 26 may sample points from the selected group configuration (block 76). In one embodiment, the module 26 may insure at least one point has been sampled from each group in the group configuration. If not, the sample may be discarded and a new sample may be taken. The consensus estimator may use the sampled points to determine a potential solution to the camera parameters and 3D model (block 48). The consensus estimator may verify the solution over all points (block 50). That is, the verification of the solution may be performed over the points presented to the module 26, not just the points in the sample group configuration or the current configurations from which sampling is performed. The verification may generally comprise generating a score for the solution, indicating how well the solution fits the points as a whole. Relative scores of solutions may indicate which solution is a better fit (e.g. in the least-squares sense).

If the maximum number of iterations of the consensus estimator have been performed, or if the solution has converged to an acceptable accuracy (decision block 52, "yes" leg), the module 26 may be complete. The maximum number of iterations may be user selected or may be a default value, and generally may be provided to cause the consensus estimator to exit if it is not converging to a solution. The solution may be considered to be converged if its score over all the points indicates that the solution is accurate enough to move to the bundle adjustment module 28. The measurement for determining convergence may also be user programmable, may have a default value, etc.

If the maximum number of iterations have not been performed and the solution has not converged (decision block 52, "no" leg), the module 26 may check the iteration count to determine if the current configuration set should be changed (decision block 78). The determination of how many iterations are performed for each current configuration set may vary from embodiment to embodiment.

If current configuration set is to be changed (decision block 78, "yes" leg), the module 26 may select next configuration set as the current configuration set (block 80). That next configuration set may be the group configurations that include one more group than the current configuration set includes (e.g. from one to two groups, from two to three groups, etc.). The module 26 may then begin the next iteration by sampling a group configuration from the new current configuration set (block 74). If the current configuration set is not to be changed (decision block 78, "no" leg), the module 26 may begin the next iteration without modifying the current configuration set (block 74).

The structure from motion system may be used in a variety of computer vision embodiments. For example, the system may be used as part of an image stitching algorithm to connect various images into a larger composite image based on the matching of features within each image. The system may be used to identify the camera motion and 3D space of a video formed from a sequence of images. Such information may permit the insertion of objects into the video in a fashion that makes it appear that the objects were in the original 3D space when the video was captured. The system may be used to obtain a 3D model of an object in the images as well.

Furthermore, the technique of grouping data that is to be input to a consensus estimator such as RANSAC and biasing the sampling of points for the RANSAC process may be used in other technology areas besides computer vision. For example, the technique may be used in data acquisition systems, where multiple sensors are included in a given system under test. Data from each sensor may be included in a corresponding group. For example, in a seismic study of the geology of an area of land, seismic sensors may be placed at various physical positions in the area being studied. The measurements from each sensor may be a group. However, measurements from different sensors may be compared for similar spectral content to detect the seismic result of a given disturbance introduced into the system, even though the measurements may not occur at the exact same time due to differences in distance from the site of the disturbance to each sensor and differences in the underlying geology.

Exemplary System

Figure 3:
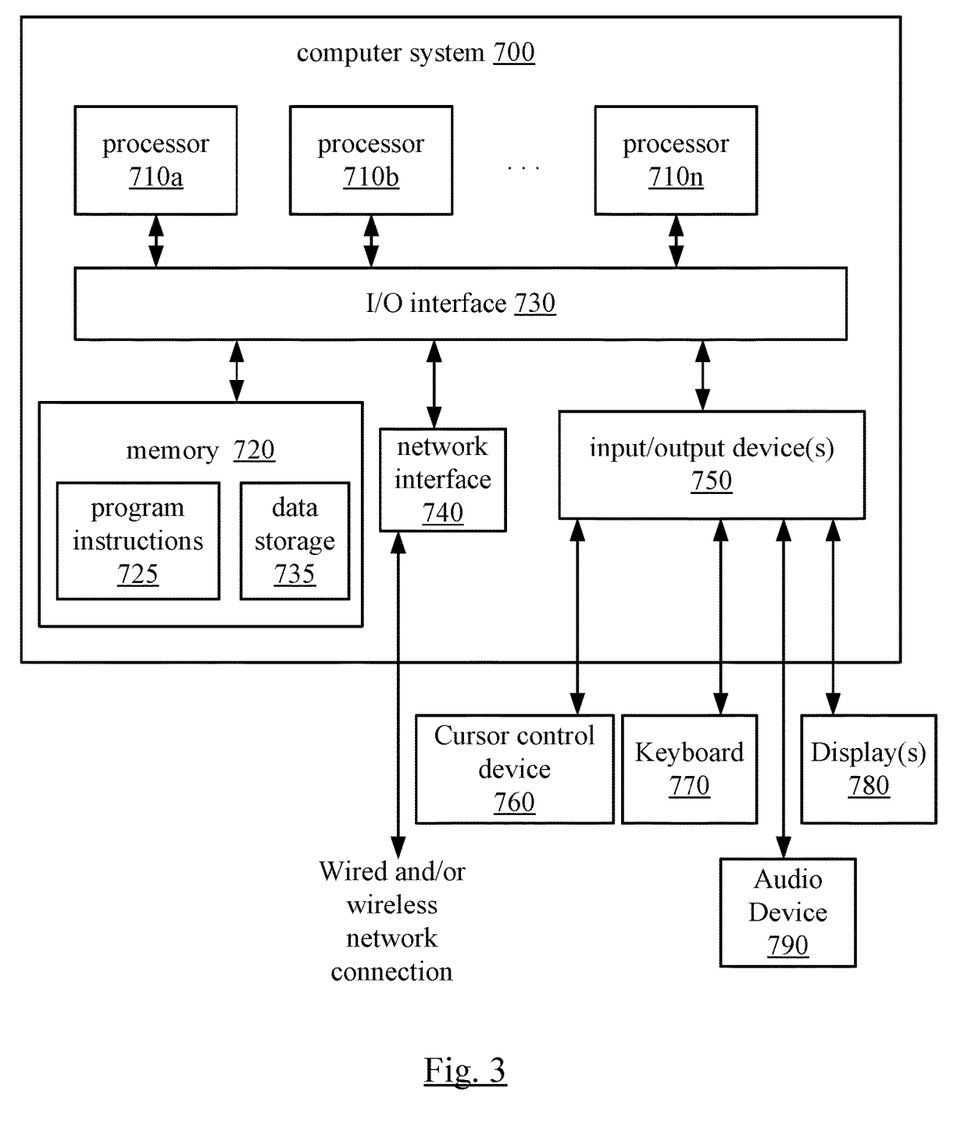
FIG. 3 illustrates an exemplary computer system that may be used in embodiments.

Various components of embodiments of a method and apparatus for camera motion estimation, 3D modeling, and other uses may be executed on one or more computer systems, which may interact with various other devices. One such computer system is illustrated by FIG. 3. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired operations, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 3, memory 720 may include program instructions 725, configured to implement embodiments of a method and apparatus described above, and data storage 735, comprising various data accessible by program instructions 725. In one embodiment, program instructions 725 may include software elements of a method and apparatus described above. Data storage 735 may include data that may be used in embodiments. In other embodiments, other or different software elements and data may be included.

In some embodiments, the computer system 700 may also include a graphics processing unit (GPU). The GPU may be optimized for graphics processing (e.g. for generating images to be displayed on a display screen connected to the computer system 700). The GPU may be programmable with program instructions according to the instruction set implemented by the GPU (e.g. instruction sets developed by graphics manufacturers such as NVIDIA or ATI). In some embodiments, the GPU may have a private, dedicated memory accessible only to the GPU. The program instructions may be stored in the private memory, in one embodiment. In one embodiment, the GPU may execute program instructions to implement some or all of the method describe herein.

Those skilled in the art will appreciate that computer system 700 is merely illustrative and is not intended to limit the scope of a method and apparatus as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

The various methods as illustrated in the drawings and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for reconstructing a three-dimensional (3D) model of a scene based on a consensus estimate of a model parameter from captured images of the scene by at least one computing device, the method comprising:
   detecting, by the at least one computing device, a first set of features in a first image of the scene and a second set of features in a second image of the scene;
   determining, by the at least one computing device, potential correspondences between the first set of features and the second set of features;
   generating, by the at least one computing device, the consensus estimate of the model parameter by:
      forming groups of the potential correspondences based on at least one image attribute;
      forming group configurations of the groups, the group configurations including configurations having one group, configurations having a maximum number of groups, and configurations having integer numbers of groups between one and the maximum number of groups;
      generating a plurality of scores, each score in which each said score based on the potential correspondences in a respective group configuration;
      selecting a configuration set that includes each of the group configurations having a same number of groups;
      sampling the potential correspondences of at least one of the group configurations within the configuration set based on the plurality of scores such that at least one correspondence has been sampled from each of the groups in the at least one group configuration; and
      determining the consensus estimate of the model parameter based on the potential correspondences sampled; and
   reconstructing, by the at least one computing device, the 3D model of the scene based at least in part on the consensus estimate of the model parameter.

2. A method as described in claim 1, wherein the score is based on a number of the potential correspondences in the respective group configuration.

3. A method as described in claim 2, wherein the group configurations having larger numbers of the potential correspondences are scored more favorably.

4. A method as described in claim 1, wherein the score is based on a ratio of inlier correspondences to outlier correspondences of the potential correspondences in the respective group configuration.

5. A method as described in claim 4, wherein the group configurations having higher ratios of the inlier correspondences to the outlier correspondences are scored more favorably.

6. A method as described in claim 1, further comprising:
   sampling the potential correspondences of at least one additional group configuration within at least one additional configuration set based on the plurality of scores; and
   determining the consensus estimate of the model parameter based on the potential correspondences sampled from the at least one group configuration and the at least one additional group configuration.

7. A method as described in claim 1, wherein the features include at least one of points, lines, curves, or surfaces.

8. A method as described in claim 1, wherein the consensus estimate of the model parameter is determined with RANSAC from the potential correspondences sampled.

9. A method as described in claim 1, further comprising generating a fit score for the consensus estimate of the model parameter that indicates a fit of the consensus estimate of the model parameter to all the potential correspondences.

10. A method as described in claim 9, further comprising, responsive to a determination that the fit score does not indicate a suitable fit of the consensus estimate of the model parameter to all the potential correspondences:
sampling the potential correspondences of at least one additional group configuration; and
updating the consensus estimate of the model parameter based on the potential correspondences sampled from the at least one group configuration and the at least one additional group configuration.

11. A method as described in claim 6, wherein the configuration set corresponds to the group configurations having one group and the additional configuration set corresponds to the group configurations having two groups.

12. A system comprising:
at least one processor; and
memory having stored thereon computer-readable instructions that are executable by the at least one processor to perform operations for reconstructing a three-dimensional (3D) model of a scene based on a consensus estimate of a model parameter from captured sensor data of the scene, the operations comprising:
detecting a first set of features in a first set of sensor data of the scene and a second set of features in a second set of sensor data of the scene;
determining potential correspondences between the first set of features and the second set of features;
generating the consensus estimate of the model parameter by:
forming groups of the potential correspondences based on at least one attribute described by the captured sensor data;
generating a plurality of scores, each score based on the potential correspondences in a respective group;
sampling the potential correspondences of at least one of the groups based on the plurality of scores;
determining the consensus estimate of the model parameter based on the potential correspondences sampled;
verifying the consensus estimate of the model parameter by generating a fit score for the consensus estimate of the model parameter that indicates a fit of the consensus estimate of the model parameter to all the potential correspondences regardless of whether the potential correspondences are included in the at least one group; and
sampling the potential correspondences of at least one additional group of the groups responsive to a determination that the consensus estimate is inaccurate according to the fit score; and
reconstructing the 3D model of the scene based at least in part on the consensus estimate of the model parameter.

13. A system as described in claim 12, wherein the score is based on a number of the potential correspondences in the respective group.

14. A system as described in claim 13, wherein the groups having larger numbers of the potential correspondences are scored more favorably.

15. A system as described in claim 12, wherein the score is based on a ratio of inlier correspondences to outlier correspondences of the potential correspondences in the respective group.

16. A system as described in claim 15, wherein the groups having higher ratios of the inlier correspondences to the outlier correspondences are scored more favorably.

17. A system as described in claim 12, wherein:
the captured sensor data of the scene comprises images of the scene;
the first set of sensor data comprises a first image of the scene;
the second set of sensor data comprises a second image of the scene; and
the at least one attribute described by the captured sensor data comprises at least one image attribute.

18. A system as described in claim 12, wherein the operations further comprise
updating the consensus estimate of the model parameter based on the potential correspondences sampled from the at least one group and the at least one additional group.

19. A method for reconstructing a three-dimensional (3D) model of an object in a scene based on a consensus estimate of a model parameter from captured video of the scene by at least one computing device, the method comprising:
identifying, by the at least one computing device, a first and second image of the scene in a sequence of images forming the captured video;
detecting, by the at least one computing device, a first set of features in the first image and a second set of features in the second image;
determining, by the at least one computing device, potential correspondences between the first set of features and the second set of features;
generating, by the at least one computing device, the consensus estimate of the model parameter by:
forming groups of the potential correspondences based on at least one image attribute;
forming group configurations of the groups, the group configurations including configurations having one group, configurations having a maximum number of groups, and configurations having integer numbers of groups between one and the maximum number of groups;
generating a plurality of scores, each score based on the potential correspondences in a respective group configuration;
selecting a configuration set that includes each of the group configurations having a same number of groups;
sampling the potential correspondences of at least one of the group configurations within the configuration set based on the plurality of scores such that at least one correspondence has been sampled from each of the groups in the at least one group configuration; and
determining the consensus estimate of the model parameter based on the potential correspondences sampled; and
reconstructing, by the at least one computing device, the 3D model of the object in the scene based at least in part on the consensus estimate of the model parameter.

20. A method as described in claim 19, further comprising:
identifying at least a third image of the scene in the sequence of images;
detecting at least a third set of features in the at least a third image;

determining the potential correspondences between the first set of features and the at least third set of features; and determining the potential correspondences between the second set of features and the at least third set of features.

\* \* \* \* \*

UNITED STATES PATENT AND TRADEMARK OFFICE
CERTIFICATE OF CORRECTION

PATENT NO. : 10,755,139 B2
APPLICATION NO. : 15/494106
DATED : August 25, 2020
INVENTOR(S) : Hailin Jin and Kai Ni It is certified that error appears in the above-identified patent and that said Letters Patent is hereby corrected as shown below:

Column 14, Line 22 & 23, in Claim 1, after "each score", delete "in which said score", therefore.

Signed and Sealed this
Twentieth Day of October, 2020

Andrei Iancu
*Director of the United States Patent and Trademark Office*